US012615079B2

(12) United States Patent
Guo

(10) Patent No.: US 12,615,079 B2
(45) Date of Patent: Apr. 28, 2026

(54) METHOD AND DEVICE FOR MEASURING A SECOND BEAM VIA A SECOND COMMUNICATION CHANNEL, IN WHICH A FREQUENCY DOMAIN RESOURCE OF THE SECOND BEAM IS DIFFERENT FROM A FREQUENCY RESOURCE OF A FIRST BEAM

(71) Applicant: BEIJING XIAOMI MOBILE SOFTWARE CO., LTD., Beijing (CN)

(72) Inventor: Shengxiang Guo, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 384 days.

(21) Appl. No.: 18/273,504

(22) PCT Filed: Jan. 25, 2021

(86) PCT No.: PCT/CN2021/073638
§ 371 (c)(1),
(2) Date: Jul. 20, 2023

(87) PCT Pub. No.: WO2022/155963
PCT Pub. Date: Jul. 28, 2022

(65) Prior Publication Data
US 2024/0080087 A1 Mar. 7, 2024

(51) Int. Cl.
*H04B 7/08* (2006.01)
*H04B 17/318* (2015.01)
*H04W 36/00* (2009.01)

(52) U.S. Cl.
CPC ......... *H04B 7/0888* (2013.01); *H04B 17/328* (2023.05); *H04W 36/0069* (2018.08)

(58) Field of Classification Search
CPC ................ H04B 7/0888; H04B 17/328; H04B 7/06952; H04B 7/088; H04B 17/327;
(Continued)

(56) References Cited

U.S. PATENT DOCUMENTS

2017/0195027 A1* 7/2017 Baek ..................... H04W 24/10
2020/0045715 A1* 2/2020 Li ...................... H04W 72/0453
(Continued)

FOREIGN PATENT DOCUMENTS

| CN | 109257786 A | 1/2019 |
|---|---|---|
| CN | 110463272 A | 11/2019 |
| CN | 112019259 A | 12/2020 |

OTHER PUBLICATIONS

PCT/CN2021/073638, International Search Report and Written Opinion dated Nov. 3, 2021, 7 pages.
(Continued)

*Primary Examiner* — Mewale A Ambaye
(74) *Attorney, Agent, or Firm* — Cozen O'Connor

(57) ABSTRACT

A method for beam measurement is performed by a terminal. The terminal communicates with a network on a first beam by means of a first communication channel. The method includes: in response to determining to measure a second beam, measuring the second beam by means of a second communication channel, wherein a frequency domain resource of the second beam is different from that of the first beam.

15 Claims, 5 Drawing Sheets

(58) Field of Classification Search
CPC ......... H04W 36/0069; H04W 36/0085; H04W
36/06; H04W 36/085; H04W 84/06
See application file for complete search history.

(56) References Cited

U.S. PATENT DOCUMENTS

| | | | | |
|---|---|---|---|---|
| 2021/0144574 A1* | 5/2021 | Jin | ..................... | H04B 17/328 |
| 2021/0360594 A1* | 11/2021 | Park | .................. | H04B 7/06952 |
| 2022/0053433 A1* | 2/2022 | Abedini | ............... | H04L 5/0023 |
| 2022/0225362 A1* | 7/2022 | Yi | .......................... | H04L 1/189 |
| 2024/0340066 A1* | 10/2024 | Li | ........................ | H04W 72/40 |

OTHER PUBLICATIONS

PCT/CN2021/073638, English translation of International Search
Report and Written Opinion dated Nov. 3, 2021, 7 pages.
Chinese Patent Application No. 202180000230.6, Office Action
dated Mar. 22, 2023, 6 pages.
Chinese Patent Application No. 202180000230.6, English transla-
tion of Office Action dated Mar. 22, 2023, 6 pages.
European Patent Application No. 21920356.9 Search Report dated
Sep. 19, 2024, 8 pages.

* cited by examiner

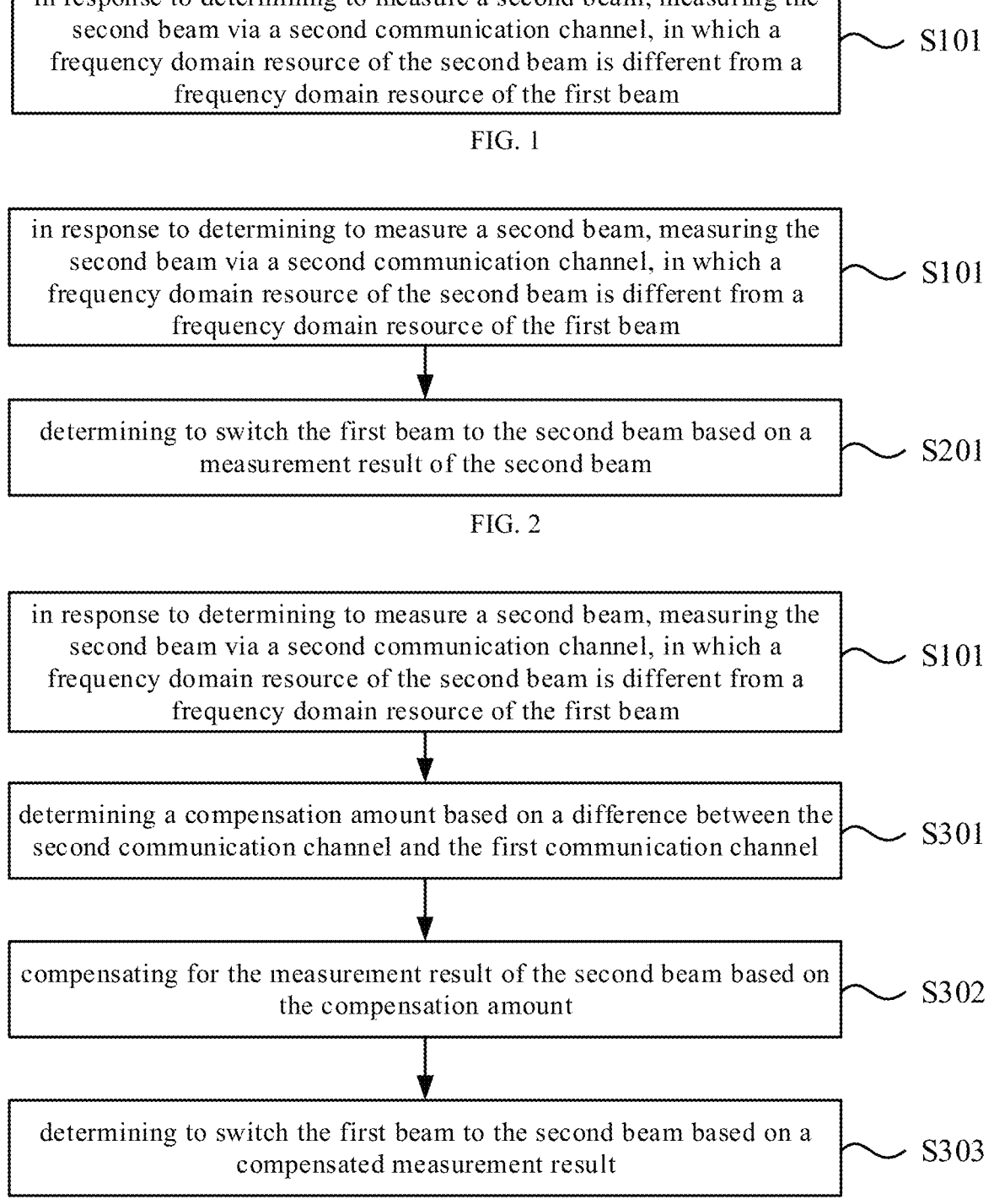

in response to determining to measure a second beam, measuring the second beam via a second communication channel, in which a frequency domain resource of the second beam is different from a frequency domain resource of the first beam          S101

FIG. 1 in response to determining to measure a second beam, measuring the second beam via a second communication channel, in which a frequency domain resource of the second beam is different from a frequency domain resource of the first beam          S101 determining to switch the first beam to the second beam based on a measurement result of the second beam          S201

FIG. 2 in response to determining to measure a second beam, measuring the second beam via a second communication channel, in which a frequency domain resource of the second beam is different from a frequency domain resource of the first beam          S101 determining a compensation amount based on a difference between the second communication channel and the first communication channel          S301 compensating for the measurement result of the second beam based on the compensation amount          S302 determining to switch the first beam to the second beam based on a compensated measurement result          S303

FIG. 3

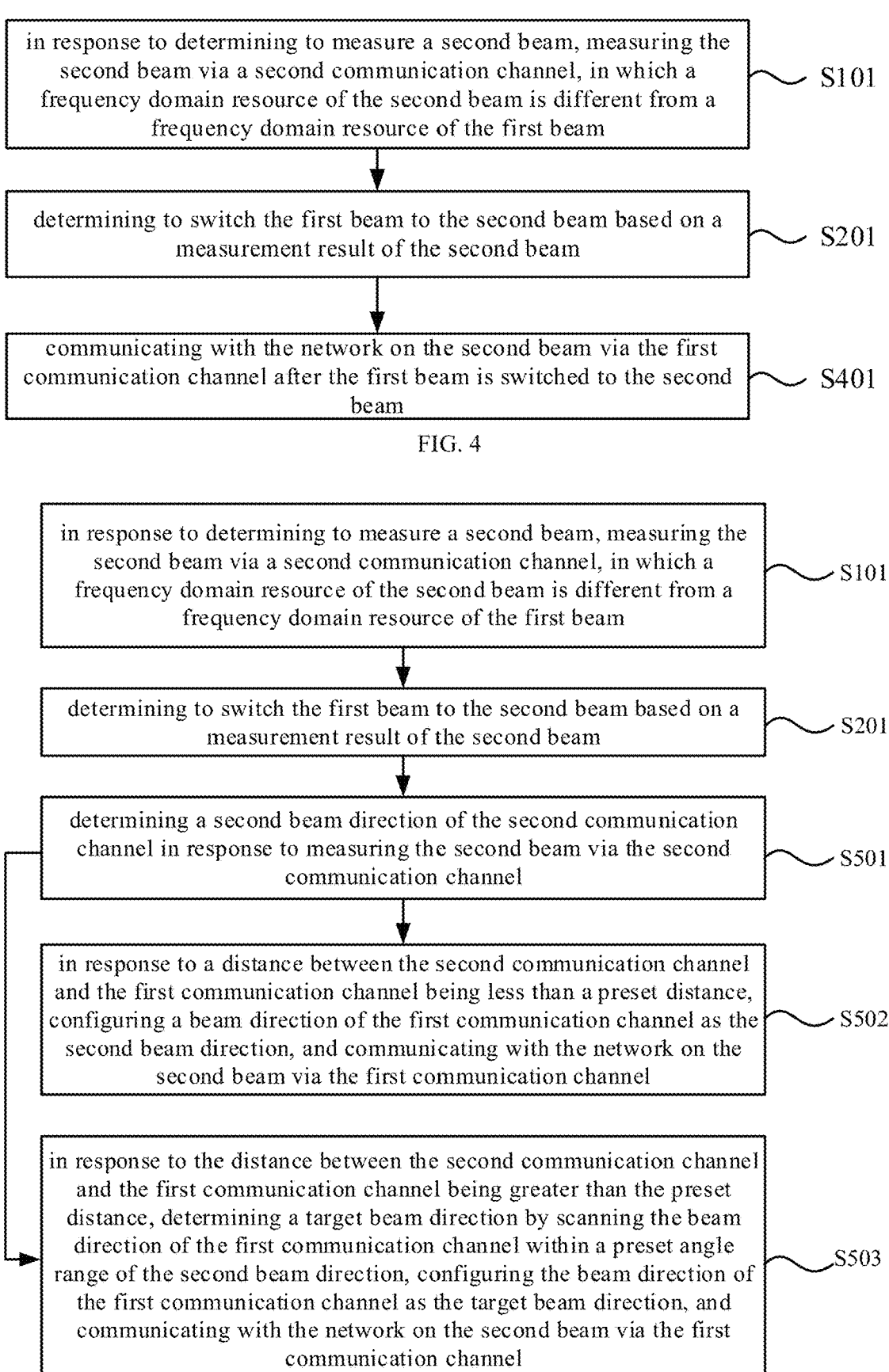

in response to determining to measure a second beam, measuring the second beam via a second communication channel, in which a frequency domain resource of the second beam is different from a frequency domain resource of the first beam       S101 determining to switch the first beam to the second beam based on a measurement result of the second beam       S201 communicating with the network on the second beam via the first communication channel after the first beam is switched to the second beam       S401

FIG. 4 in response to determining to measure a second beam, measuring the second beam via a second communication channel, in which a frequency domain resource of the second beam is different from a frequency domain resource of the first beam       S101 determining to switch the first beam to the second beam based on a measurement result of the second beam       S201 determining a second beam direction of the second communication channel in response to measuring the second beam via the second communication channel       S501 in response to a distance between the second communication channel and the first communication channel being less than a preset distance, configuring a beam direction of the first communication channel as the second beam direction, and communicating with the network on the second beam via the first communication channel       S502 in response to the distance between the second communication channel and the first communication channel being greater than the preset distance, determining a target beam direction by scanning the beam direction of the first communication channel within a preset angle range of the second beam direction, configuring the beam direction of the first communication channel as the target beam direction, and communicating with the network on the second beam via the first communication channel       S503

FIG. 5

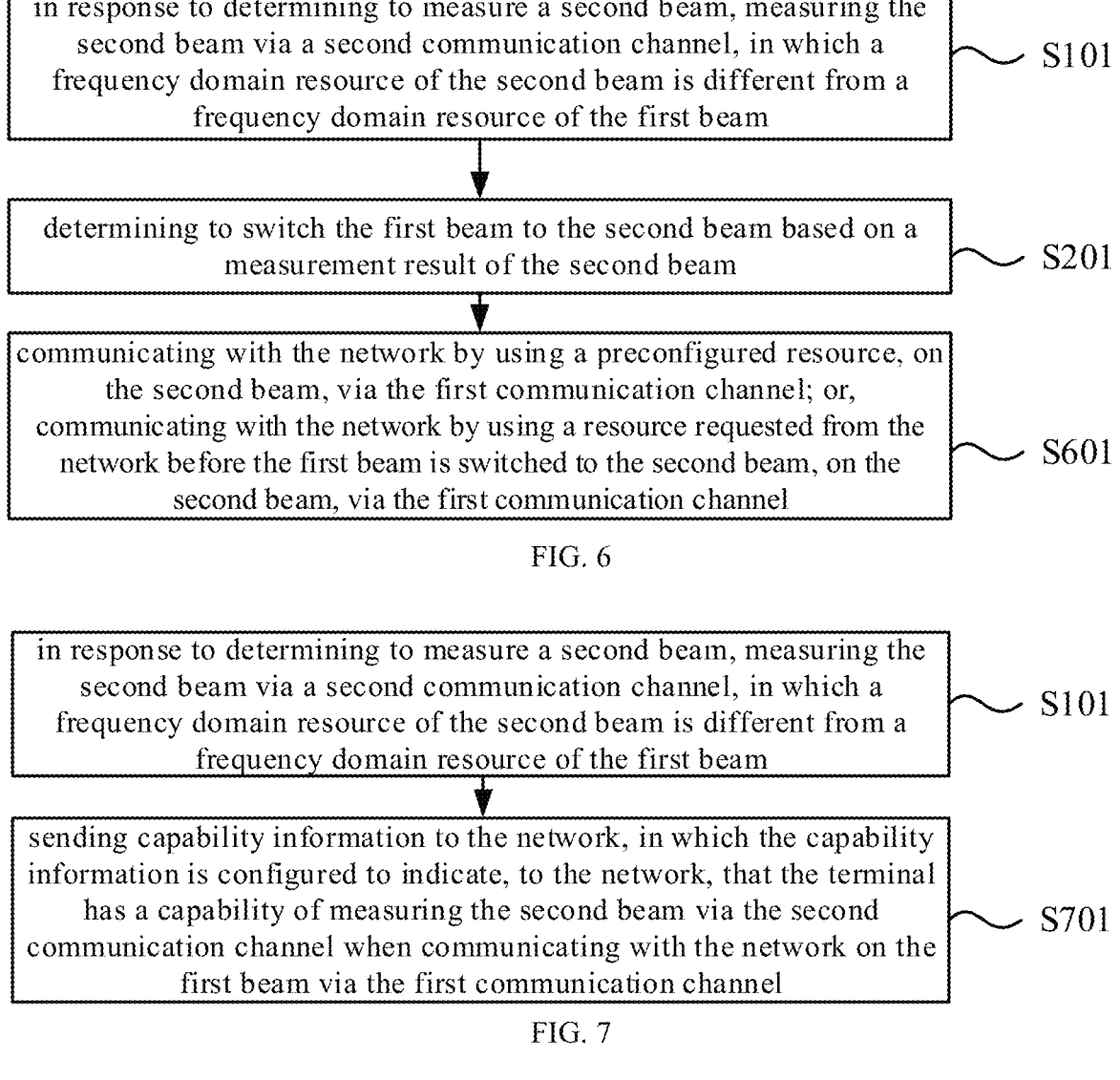

in response to determining to measure a second beam, measuring the second beam via a second communication channel, in which a frequency domain resource of the second beam is different from a frequency domain resource of the first beam          S101 determining to switch the first beam to the second beam based on a measurement result of the second beam          S201 communicating with the network by using a preconfigured resource, on the second beam, via the first communication channel; or, communicating with the network by using a resource requested from the network before the first beam is switched to the second beam, on the second beam, via the first communication channel          S601

FIG. 6 in response to determining to measure a second beam, measuring the second beam via a second communication channel, in which a frequency domain resource of the second beam is different from a frequency domain resource of the first beam          S101 sending capability information to the network, in which the capability information is configured to indicate, to the network, that the terminal has a capability of measuring the second beam via the second communication channel when communicating with the network on the first beam via the first communication channel          S701

FIG. 7 apparatus for measuring a beam          801 beam measuring module

1304 — memory processing component

1320 — processor communication component — 1316

1306 — power supply component

1308 — multimedia component sensor component — 1314

1310 — audio component

I/O interface — 1312

METHOD AND DEVICE FOR MEASURING A SECOND BEAM VIA A SECOND COMMUNICATION CHANNEL, IN WHICH A FREQUENCY DOMAIN RESOURCE OF THE SECOND BEAM IS DIFFERENT FROM A FREQUENCY RESOURCE OF A FIRST BEAM

CROSS-REFERENCE TO RELATED APPLICATION

This application is the U.S. national application of International Application No. PCT/CN2021/073638, filed on Jan. 25, 2021, the entire contents of which are incorporated herein by reference.

TECHNICAL FIELD

The disclosure relates to a field of communication technologies, and specifically to a method for measuring a beam, an electronic device and a computer-readable storage medium.

BACKGROUND

Cellular networks may use beam-forming of antenna signals to improve transmissions between terminals and base stations. When a terminal communicates with a base station via a beam, if the terminal needs to switch the beam, beams of the base station may be measured, and an appropriate beam is selected for communication based on a measurement result.

In a conventional cellular network, frequency domain resources occupied by different beams of the base station are identical. Then, when the terminal switches the beam, the terminal measures different beams without switching the frequency domain resources.

In a non-terrestrial network (NTN), since a coverage area of a cell is very large and there are a lot of users scheduling simultaneously, in order to ensure the performance of a communication system, the frequency domain resources occupied by the different beams may be different.

In the NTN, when the terminal switches the beam, frequency domain resources need to be switched to measure different beams, and a time required for switching the frequency domain resources is relatively long, which easily results in a communication delay. Moreover, in the NTN, a satellite sending a beam is in a high-speed motion. Since the time required for switching the frequency domain resource by the terminal is relatively long, the satellite has moved to other positions during this time period, the situation where the satellite sends the beam has changed for the terminal, it is possible to occur beam switch failure. After the switching fails, since the situation of an original beam also changes, there may even be a problem of being unable to switch back to the original beam.

SUMMARY

According to a first aspect of the present disclosure, a method for measuring a beam is performed by a terminal. The terminal communicates with a network on a first beam via a first communication channel. The method includes:
  in response to determining to measure a second beam, measuring the second beam via a second communication channel, in which a frequency domain resource of the second beam is different from a frequency domain resource of the first beam.

According to a second aspect of the present disclosure, a terminal is provided, which communicates with a network on a first beam via a first communication channel and includes:
  a processor; and
  a memory for storing instructions executable by the processor;
The processor is configured to in response to determining to measure a second beam, measure the second beam via a second communication channel, wherein a frequency domain resource of the second beam is different from a frequency domain resource of the first beam.

According to a third aspect of the present disclosure, a non-transitory computer-readable storage medium with a computer program stored thereon is provided. When the program is executed by a processor, the steps of the above method are implemented as described in the first aspect.

BRIEF DESCRIPTION OF THE DRAWINGS

In order to explain the technical solutions in the embodiments of the present disclosure more clearly, the drawings described in the embodiments will be briefly introduced below. The diagrams described as below are some embodiments of the present disclosure. Those skilled in the art may also obtain other drawings based on these drawings.

FIG. 1 is a flowchart illustrating a method for measuring a beam according to an embodiment of the present disclosure.

FIG. 2 is a flowchart illustrating another method for measuring a beam according to an embodiment of the present disclosure.

FIG. 3 is a flowchart illustrating another method for measuring a beam according to an embodiment of the present disclosure.

FIG. 4 is a flowchart illustrating another method for measuring a beam according to an embodiment of the present disclosure.

FIG. 5 is a flowchart illustrating another method for measuring a beam according to an embodiment of the present disclosure.

FIG. 6 is a flowchart illustrating another method for measuring a beam according to an embodiment of the present disclosure.

FIG. 7 is a flowchart illustrating another method for measuring a beam according to an embodiment of the present disclosure.

FIG. 8 is a block diagram illustrating an apparatus for measuring a beam according to an embodiment of the present disclosure.

DETAILED DESCRIPTION

Figure 9:
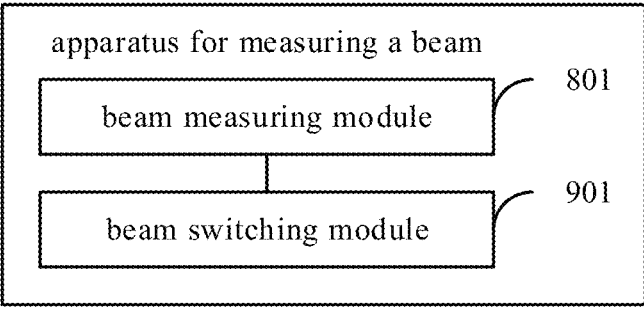
FIG. 9 is a block diagram illustrating another apparatus for measuring a beam according to an embodiment of the present disclosure.

The technical scheme in the embodiments of the present disclosure will be described clearly and completely in combination with the appended drawings in the embodiments of the present disclosure. The embodiments described are a part of embodiments in the present disclosure, rather than all the embodiments. On the basis of the embodiments of the present disclosure, all other embodiments obtained by those skilled in the art are within the protection scope of the present disclosure.

According to the embodiments of the present disclosure, if the second beam needs to be measured when a communication with the network is performed on the first beam via the first communication channel, the second beam may be measured via the second communication channel without adjusting the frequency domain resource of the first beam, so as to rapidly measure the second beam, and thus reduce the delay of measuring the second beam. Since the switch delay is very short, and a movement distance of a satellite is relatively short during this period, a beam change of the satellite is relatively small for the terminal, thus facilitating to ensure that the switch is successful.

FIG. 1 is a flowchart illustrating a method for measuring a beam according to the embodiment of the present disclosure. The method for measuring a beam as illustrated in the embodiment is applicable to a terminal. The terminal includes but not limited to a mobile phone, a tablet computer, a wearable device, a sensor, an Internet of things device and other electronic devices. The terminal as a user equipment (UE) may communicate with a base station. The base station includes but not limited to a 4G base station, a 5G base station and a 6G base station.

In an embodiment, the base station may be a terrestrial base station, and the terminal may communicate with the base station via an aerial device in a the NTN. The aerial device includes but not limited to a satellite, an unmanned aerial vehicle (UAV) and an aerial platform. Taking the aerial device is a satellite as an example in the following embodiments, the technical solution of the disclosure is illustrated.

In an embodiment, the aerial device may form a cell in the NTN and send beams in different directions, and the aerial device may send downlink information to the terminal via the sent beams. The terminal may also send uplink information to the aerial device via sending beams.

In an embodiment, the terminal may measure the beams sent by the aerial device. For example, when the beam needs to be switched, a neighboring beam of a beam where the terminal is currently located (i.e., a beam currently used for receiving downlink information) may be measured. Specifically, a synchronization signal block (SSB), a channel state information reference signal (CSI-RS), etc. carried in the beam may be measured.

In the NTN, frequency domain resources occupied by different beams sent by a satellite may be different. For example, different beams may occupy different frequency points and bandwidth parts (BWPs). For example, the first beam and the second beam are beams in the NTN, which may belong to a same cell, or may belong to different cells, and frequency points occupied by the first beam and the second beam are different. When the terminal needs to switch the beam, a frequency domain resource occupied by a beam where the terminal is currently located may be different from a frequency domain resource occupied by the neighboring beam. For example, the frequency domain resource occupied by the current beam is a frequency point f1, the frequency domain resource occupied by the neighboring beam is a frequency point f2, a communication channel of the terminal is currently in communication with the satellite at the frequency point f1, and in order to measure the neighboring beam, the communication channel needs to be switched to the frequency point f2.

In an embodiment, the communication channel at least includes a radio frequency transceiving module in the terminal, and may further include an antenna. For example, the communication channel may be a sending and receiving point in the terminal. In order to switch the communication channel from the frequency point f1 to the frequency point f2, the terminal needs to adjust the frequency point of a transceiving signal of the radio frequency transceiving module from f1 to f2, which generally takes a relatively long time.

As illustrated in FIG. 1, the terminal communicates with the network via the first communication channel (for example, an aerial device in the NTN). The method for measuring the beam may include the following step.

At step S101, in response to determining to measure a second beam, the second beam is measured via a second communication channel. A frequency domain resource of the second beam is different from a frequency domain resource of the first beam.

In an embodiment, a beam where the terminal is currently located is a first beam, and a channel used for communication on the first beam is a first channel. The second beam may be a neighboring beam of the first beam, or any other beam sent by the satellite different from the first beam, and the frequency domain resource of the second beam is different from the frequency domain resource of the first beam. For example, a frequency point of the first beam is different from a frequency point of the second beam, or a bandwidth part (BWP) occupied by the first beam is different from a BWP occupied by the second beam.

In an embodiment, in addition to the first communication channel, the second communication channel may be configured in the terminal. When the second beam needs to be measured, the second beam may be measured via the second communication channel, and a frequency domain resource occupied by the first communication channel may not be adjusted, and a communication with the satellite may be performed on the first beam still using the first communication channel.

For example, the frequency point of the first beam is f1, and the frequency point of the second beam is f2. When the terminal performs communication on the first beam by using the first channel, the frequency point of the first channel is f1. When the terminal needs to measure the second beam, the second beam may be measured via the second communication channel.

Before the second beam is measured, the second communication channel may be in a started state and may be kept in communication at the frequency point f2. Alternatively, before the second beam is measured, the second communication channel is not in a started state, and in response to determining to measure the second beam, the second communication channel is started, and the second communication channel is set in communication at the frequency point f2. Alternatively, before the second beam is measured, the second communication channel has been started, but is in an idle state, the second communication channel is not at any frequency point, and in response to determining to measure the second beam, the second communication channel is set in communication at the frequency point f2.

Therefore, the second beam may be measured via the second communication channel at the frequency point f2, during which the frequency point of the second communication channel does not need to be adjusted from one frequency point to another, so that the second beam may be rapidly measured at the frequency point f2, thus reducing the delay of measuring the second beam, and a communication with the network on the first beam via the first communication channel may be continued without adjusting the frequency point of the first communication channel from f1 to f2.

According to the embodiments of the present disclosure, if the second beam needs to be measured when a communication with the network is performed on the first beam via the first communication channel, the second beam may be measured via the second communication channel without adjusting the frequency domain resource of the first beam, so as to rapidly measure the second beam, and thus reduce the delay of measuring the second beam. Since the switch delay is very short, and a movement distance of a satellite is relatively short during this period, a beam change of the satellite is relatively small for the terminal, thus facilitating to ensure that the switch is successful.

In an embodiment, the terminal may determine its own position information, and determine whether to measure the second beam or not based on the determined position information. For example, when the terminal determines that its own position is located at an edge of the first beam, the terminal may determine to measure the second beam.

In an embodiment, the terminal may measure the first beam to obtain a measurement result, such as measuring a reference signal receiving power (RSRP) and a reference signal receiving quality (RSRQ), and determine whether to measure the second beam based on the measurement result. For example, when the RSRP is lower than a first preset power, the terminal may determine to measure the second beam.

In an embodiment, the terminal may determine to measure the second beam in response to receiving a signaling sent by the network side indicating to measure the second beam.

In an embodiment, the terminal may periodically measure the second beam. Then, the terminal may determine to measure the second beam at the beginning of a period of measuring the beam.

In an embodiment, the network may send a measurement resource to the terminal via the first beam, so that the terminal measures the second beam by using the measurement resource. For example, when the measurement resource is a time-frequency resource of a reference signal in the second beam, the terminal may measure the reference signal in the second beam at the measurement resource.

In an embodiment, the second communication channel may be a dedicated communication channel for measuring the beam. That is, the second communication channel is only configured to measure the beam, for example, only configured to measure the second beam without being used for other communication operations than measuring the beam.

In an embodiment, the second communication channel may be a communication channel for other communication operations than measuring the beam. In response to determining to measure the second beam, measuring the second beam via the second communication channel includes:

in response to determining to measure the second beam, and the second communication channel being idle, measuring the second beam via the second communication channel.

In an embodiment, when the second communication channel is a communication channel for other communication operations than measuring the beam, for example, when the first communication channel is configured for communication in the NTN, the second communication channel is configured for communication in a terrestrial cellular network, or the second communication channel is configured for Wi-Fi communication, the second communication channel may be detected to determine whether the second communication channel is idle. When the second communication channel is idle, and the second communication channel is not at any frequency point, the second beam may be measured via the second communication channel.

In an embodiment, the first communication channel includes at least two subchannels, and the second communication channel is a part of the at least two subchannels.

In an embodiment, the first communication channel includes at least two subchannels. For example, each subchannel is a sending and receiving point, the first communication channel includes four subchannels, and the second communication channel is one of the four subchannels. Then, measuring the second beam via the second communication channel may still keep three subchannels in the first communication channel to be in communication on the first beam, which is beneficial to avoiding a communication interruption caused by interrupting the communication on the first beam in order to measure the second beam.

FIG. 2 is a flowchart illustrating another method for measuring a beam according to an embodiment of the present disclosure. As illustrated in FIG. 2, in some embodiments, the method further includes the following step.

At step S201, it is determined to switch the first beam to the second beam based on a measurement result of the second beam.

In an embodiment, a measurement result may be obtained by measuring the second beam via the second communication channel, and it may be further determined whether to switch the first beam to the second beam based on the measurement result. For example, the measurement result is compared with a preset threshold, and whether to switch the first beam to the second beam is determined based on a comparison result. For example, the measurement result is the RSRP, and it may be determined to switch the first beam to the second beam when the RSRP is higher than a second preset power, or higher than the RSRP of the first beam.

FIG. 3 is a flowchart illustrating another method for measuring a beam according to an embodiment of the present disclosure. As illustrated in FIG. 3, in some embodiments, determining to switch the first beam to the second beam based on a measurement result of the second beam includes the following steps.

At step S301, a compensation amount is determined based on a difference between the second communication channel and the first communication channel.

At step S302, the measurement result of the second beam is compensated based on the compensation amount.

At step S303, it is determined to switch the first beam to the second beam based on a compensated measurement result.

In an embodiment, a beam direction of the first beam may be different from a beam direction of the second beam, so a measurement result obtained by measuring the second beam via the first communication channel may be different from a measurement result obtained by measuring the second beam via the second communication channel.

In an embodiment, it may be determined whether to switch the first beam to the second beam by comparing the measurement result with the preset threshold. However, the preset threshold may be generally set based on a result obtained from measuring via the first communication channel. In this case, the measurement result by measuring via the first communication channel is compared with the preset threshold to obtain a comparison result, which may be different from a comparison result obtained from comparing the measurement result by measuring via the second communication channel with the preset threshold. The difference may be reflected in the difference between the second communication channel and the first communication channel.

For example, the measurement result obtained from measuring the second beam via the first communication channel is P1, the measurement result obtained from measuring the second beam via the second communication channel is P2, and the preset threshold is P0, in which P1 is greater than P0, but P2 is less than P0. In this case, a wrong result may be obtained from directly comparing the measurement result P2 with P0, which generates a misjudgment of a result of whether to switch the first beam to the second beam.

In an embodiment, the difference may include but not limited to:

a difference between the first communication channel and the second communication channel in a beam direction, and a difference between the first communication channel and the second communication channel in a radio frequency parameter (for example, an insertion loss, a number of radio frequency channels).

Then, the compensation amount is determined based on the difference between the second communication channel and the first communication channel, to compensate for the measurement result obtained from measuring the second beam via the second communication channel, so as to ensure that a correct comparison result may be obtained from comparing the compensated measurement result with the preset threshold.

In an embodiment, when the second beam is measured, the difference between measuring via the first communication channel and measuring via the second communication channel is P1, in which the measurement result obtained from measuring via the first communication channel is ΔP greater than the measurement result obtained from measuring via the second communication channel. The difference may be predetermined, for example, may be implemented by the terminal based on an internal algorithm, or may be determined by measuring in advance the second beam respectively via the first communication channel and the second communication channel.

For the measurement result P2 obtained from measuring the second beam via the second communication channel, ΔP may be added to P2 to obtain the compensated measurement result P2+ΔP, and a correct result may be further obtained from comparing P2+ΔP with the preset threshold P0, so as to ensure whether to switch the first beam to the second beam is correctly determined. For example, when P1 is greater than P0, but P2 is less than P0, P2 is added to ΔP, and P2+ΔP may be greater than P0.

FIG. 4 is a flowchart illustrating another method for measuring a beam according to an embodiment of the present disclosure. As illustrated in FIG. 4, in some embodiments, the method further includes the following step.

At step S401, a communication with the network is performed on the second beam via the first communication channel after the first beam is switched to the second beam.

In an embodiment, when the second beam is measured via the second communication channel, the second communication channel may be released, and a communication with the network is performed on the second beam via the first communication channel in response to determining a need of switching to the second beam.

FIG. 5 is a flowchart illustrating another method for measuring a beam according to an embodiment of the present disclosure. As illustrated in FIG. 5, in some embodiments, communicating with the network on the second beam via the first communication channel includes the following steps.

At step S501, a second beam direction of the second communication channel is determined in response to measuring the second beam via the second communication channel.

At step S502, in response to a distance between the second communication channel and the first communication channel being less than a preset distance, a beam direction of the first communication channel is configured as the second beam direction, and a communication with the network is performed on the second beam via the first communication channel.

At step S503, in response to the distance between the second communication channel and the first communication channel being greater than the preset distance, a target beam direction is determined by scanning the beam direction of the first communication channel within a preset angle range of the second beam direction, the beam direction of the first communication channel is configured as the target beam direction, and a communication with the network is performed on the second beam via the first communication channel.

In an embodiment, although communication is performed on the second beam by using the first communication channel after the beam is switched, the second beam is measured by using the second communication channel. In general, it may not be immediately determined in which direction the first communication channel is set to have a best communication quality after the terminal switches to the second beam. However, since the second beam is measured by using the second communication channel, a beam direction of the second communication channel has been adjusted to a direction suitable for receiving the second beam in the measurement process. Therefore, the second beam direction of the second communication channel may be determined when the second beam is measured via the second communication channel, and a beam direction of using the first communication channel may be set based on the second beam direction, to perform communication on the second beam.

In an embodiment, the distance between the second communication channel and the first communication channel may be determined, such as a distance between radio frequency modules of two communication channels, or a distance between antennas of two communication channels.

When the distance is small, for example, less than a preset distance, a difference between communication effects of the first communication channel and the second communication channel in the same beam direction is small, so the beam direction of the first communication channel may be set in the second beam direction, that is, the first communication channel is set to use the second beam direction, and the terminal communicates with the network on the second beam via the first communication channel, to ensure a good communication effect.

When the distance is large, for example, greater than the preset distance, the difference between communication effects of the first communication channel and the second communication channel in the same beam direction is large, so it may be difficult for directly setting the first communication channel in the second beam direction to ensure a good communication effect. However, in general, a size of the terminal is limited, the communication effect of the second beam is good by using the second beam direction on the second communication channel, and a beam direction with a good communication effect by using the second beam on the first communication channel may not deviate greatly from the second beam direction. Therefore, the target beam direction may be determined by scanning the beam direction of the first communication channel within the preset angle range of the second beam direction, the beam direction of the first communication channel may be set to be the target beam direction, and the communication with the network is performed on the second beam via the first communication channel, so as to ensure a good communication effect.

FIG. 6 is a flowchart illustrating another method for measuring a beam according to an embodiment of the present disclosure. As illustrated in FIG. 6, in some embodiments, communicating with the network on the second beam via the first communication channel includes the following step.

At step S601, a communication with the network is performed by using a preconfigured resource, on the second beam, via the first communication channel;

or, a communication with the network is performed by using a resource requested from the network before the first beam is switched to the second beam, on the second beam, via the first communication channel.

In an embodiment, the communication with the network may be performed on the second beam via the first communication channel after the first beam is switched to the second beam. The resource used for communication may be preconfigured by the network. For example, the configuration may be carried in system information and sent to the terminal in advance. The resource used for communication may be requested by the terminal to the network. For example, before switching to the second beam, the terminal sends a request to the network when communicating by using the first beam, and the network configures a resource for the terminal via the first beam. Accordingly, it may be ensured that the terminal communicates with the network on the second beam by directly using the resource after switching to the second beam, without requesting the resource to the network again, which reduces a communication delay.

FIG. 7 is a flowchart illustrating another method for measuring a beam according to an embodiment of the present disclosure. As illustrated in FIG. 7, in some embodiments, the method further includes the following step.

At step S701, capability information is sent to the network. The capability information is configured to indicate, to the network, that the terminal has a capability of measuring the second beam via the second communication channel when communicating with the network on the first beam via the first communication channel.

In an embodiment, not all terminals have a plurality of communication channels, and even if the terminals have the plurality of communication channels, not all the terminals support that the second beam is measured via the second communication channel when communicating on the first beam via the first communication channel. Therefore, the terminal may determine its own capability first to generate capability information, and send the capability information to the network to inform the network of whether the terminal has a capability of measuring the second beam via the second communication channel when communicating with the network on the first beam via the first communication channel.

Corresponding to the embodiments of the method for measuring the beam, the embodiments of the apparatus for measuring the beam are further provided in the disclosure.

FIG. 8 is a block diagram illustrating an apparatus for measuring a beam according to an embodiment of the present disclosure. The apparatus for measuring a beam as illustrated in the embodiment is applicable to a terminal. The terminal includes but not limited to a mobile phone, a tablet computer, a wearable device, a sensor, an Internet of things device and other electronic devices. The terminal as a user equipment (UE) may communicate with a base station. The base station includes but not limited to a 4G base station, a 5G base station and a 6G base station.

In an embodiment, the base station may be a terrestrial base station, and the terminal may communicate with the base station via an aerial device in a non-terrestrial base station. The aerial device includes but not limited to a satellite, a UAV and an aerial platform. Taking the aerial platform is a satellite as an example in the following embodiments, the technical solution of the disclosure is illustrated.

As illustrated in FIG. 8, the terminal communicates with the network via the first communication channel (for example, an aerial device in the NTN). The apparatus for measuring the beam may include a beam measuring module 801.

The beam measuring module 801 is configured to, in response to determining to measure a second beam, measure the second beam via a second communication channel. A frequency domain resource of the second beam is different from a frequency domain resource of the first beam.

In some embodiments, the second communication channel may be a dedicated communication channel for measuring the beam.

In some embodiments, the second communication channel may be a communication channel for other communication operations than measuring the beam. The beam measuring module is configured to, in response to determining to measure the second beam, and the second communication channel being idle, measure the second beam via the second communication channel.

In some embodiments, the first communication channel includes at least two subchannels, and the second communication channel is a part of the at least two subchannels.

FIG. 9 is a block diagram illustrating another apparatus for measuring a beam according to the embodiment of the present disclosure. As illustrated in FIG. 9, in some embodiments, the apparatus further includes a beam switching module 901.

The beam switching module 901 is configured to determine to switch the first beam to the second beam based on a measurement result of the second beam.

Figure 10:
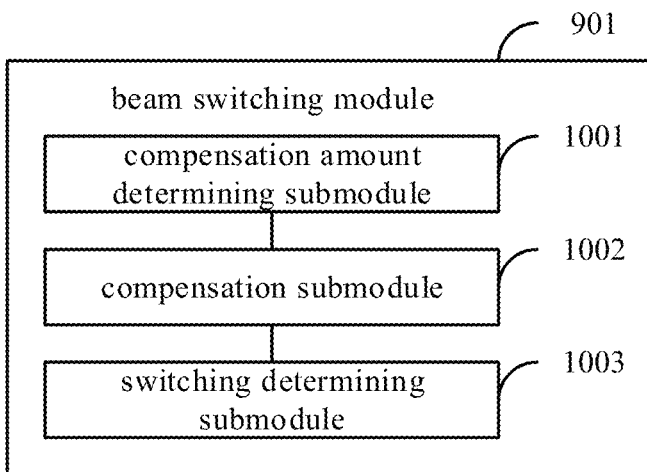
FIG. 10 is a block diagram illustrating a beam switching module according to an embodiment of the present disclosure.

FIG. 10 is a block diagram illustrating a beam switching module according to the embodiment of the present disclosure. As illustrated in FIG. 10, in some embodiments, the beam switching module 901 includes a compensation amount determining submodule 1001, a compensation submodule 1002 and a switching determining submodule 1003.

The compensation amount determining submodule 1001 is configured to determine a compensation amount based on a difference between the second communication channel and the first communication channel.

The compensation submodule 1002 is configured to compensate for the measurement result of the second beam based on the compensation amount.

The switching determining submodule 1003 is configured to determine to switch the first beam to the second beam based on a compensated measurement result.

In an embodiment, the difference includes but not limited to: a difference between the first communication channel and the second communication channel in a beam direction, and a difference between the first communication channel and the second communication channel in a radio frequency parameter.

Figure 11:
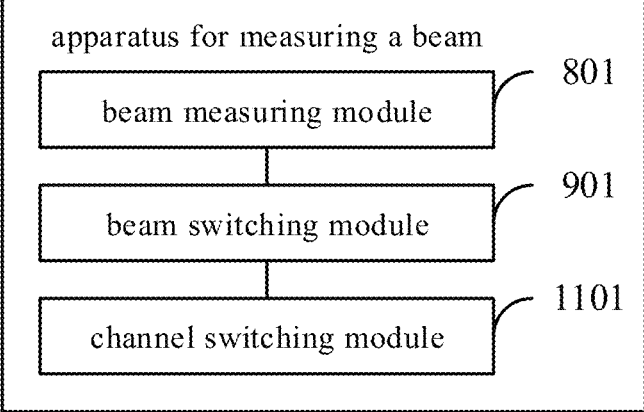
FIG. 11 is a block diagram illustrating another apparatus for measuring a beam according to an embodiment of the present disclosure.

FIG. 11 is a block diagram illustrating another apparatus for measuring a beam according to an embodiment of the present disclosure. As illustrated in FIG. 11, in some embodiments, the apparatus further includes a channel switching module 1101.

The channel switching module 1101 is configured to communicate with the network on the second beam via the first communication channel after the first beam is switched to the second beam.

In some embodiments, the channel switching module is configured to determine a second beam direction of the second communication channel in response to measuring the second beam via the second communication channel;

in response to a distance between the second communication channel and the first communication channel being less than a preset distance, configure a beam direction of the first communication channel as the second beam direction, and communicate with the network on the second beam via the first communication channel; and in response to the distance between the second communication channel and the first communication channel being greater than the preset distance, determine a target beam direction by scanning the beam direction of the first communication channel within a preset angle range of the second beam direction, configure the beam direction of the first communication channel as the target beam direction, and communicate with the network on the second beam via the first communication channel.

In some embodiments, the channel switching module is configured to communicate with the network by using a preconfigured resource, on the second beam, via the first communication channel.

or, communicate with the network by using a resource requested from the network before the first beam is switched to the second beam, on the second beam, via the first communication channel.

Figures 12, 13:
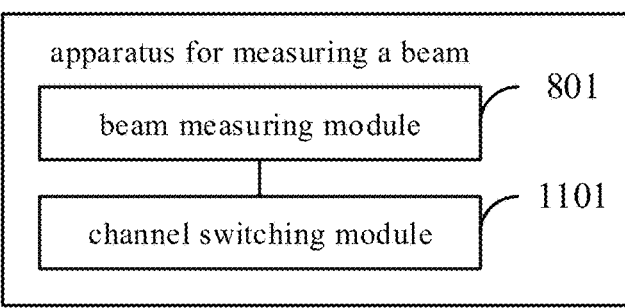
FIG. 12 is a block diagram illustrating another apparatus for measuring a beam according to an embodiment of the present disclosure.
FIG. 13 is a block diagram illustrating a device for measuring a beam according to an embodiment of the present disclosure.

FIG. 12 is a block diagram illustrating another apparatus for measuring a beam according to an embodiment of the present disclosure. As illustrated in FIG. 12, in some embodiments, the apparatus further includes a capability sending module 1201.

The capability sending module 1201 is configured to send capability information to the network. The capability information is configured to indicate, to the network, that the terminal has a capability of measuring the second beam via the second communication channel when communicating with the network on the first beam via the first communication channel.

In some embodiments, the first beam and the second beam are beams in a non-terrestrial network.

With regard to the apparatus in the above embodiments, the specific implementation in which each module performs the operation has been described in detail in the embodiments of the method, which will not be elaborated here.

The embodiments of the apparatus refer to part descriptions of the embodiments of the method since they correspond to the embodiments of the method. The embodiments of the apparatus described above are only exemplary, in which the above modules described as separate parts may or may not be physically separated, the parts shown as modules may or may not be physical modules, that is, may be located in one place, or may be distributed on a plurality of network modules. Some or all modules may be selected according to the actual needs to achieve the purpose of the present disclosure. Those skilled in the art may understand and implement it without any creative effort.

An electronic device is further provided in the disclosure, which includes:

a processor; and a memory for storing instructions executable by the processor;

the processor is configured to perform the method as described in the above any embodiment.

A computer-readable storage medium with a computer program stored thereon is further provided in the disclosure. When the program is executed by a processor, steps in the method in the above any embodiment are implemented.

FIG. 13 is a block diagram illustrating a device 1300 for measuring a beam according to an embodiment of the present disclosure. For example, the device 1300 may be a mobile phone, a computer, a digital broadcasting terminal, a messaging device, a game console, a tablet device, a medical equipment, a fitness equipment, a personal digital assistant, etc.

As illustrated FIG. 13, the device 1300 may include one or more components: a processing component 1302, a memory 1304, a power supply component 1306, a multimedia component 1308, an audio component 1310, an input/output (I/O) interface 1312, a sensor component 1314, and a communication component 1316.

The processing component 1302 generally controls the whole operation of the device 1300, such as operations related to display, a phone call, data communication, a camera operation and a recording operation. The processing component 1302 may include one or more processors 1320 to perform instructions, to complete all or part of the steps of the above method. In addition, the processing component 1302 may include one or more modules for the convenience of interactions between the processing component 1302 and other components.

For example, the processing component 1302 may include a multimedia module for the convenience of interactions between the multimedia component 1308 and the processing component 1302.

The memory 1304 is configured to store all types of data to support the operation of the device 1300. Examples of the data include instructions of any applications or methods executed on the device 1300, contact data, phone book data, messages, pictures, videos, etc. The memory 1304 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 1306 may provide power supply for all components of the device 1300. The power supply component 1306 may include a power supply management system, one or more power supplies, and other components related to generating, managing and distributing power for the device 1300.

The multimedia component 1308 includes an output interface screen provided between the device 1300 and the user. In some embodiments, the screen may include a liquid crystal display (LCD) and a touch panel (TP). When the screen includes a touch panel, the screen may be implemented as a touch screen to receive input signals from the user. The touch panel includes one or more touch sensors to sense a touch, a slide and gestures on the touch panel. The touch sensor may not only sense the boundary of the touch or slide action, but also detect the duration and pressure related to the touch or slide action. In some embodiments, the multimedia component 1308 includes a front camera and/or a rear camera. When the device 1300 is in an operation mode, such as a shooting mode or a video mode, at least one of the front camera or the rear camera may receive external multimedia data. Each of the front camera and rear camera may be a fixed optical lens system or an optical lens system with a focal length and an optical zoom capacity.

The audio component 1310 is configured as an output and/or input signal. For example, the audio component 1310 includes a microphone (MIC). When the device 1300 is in an operation mode, such as call mode, record mode, and speech recognition mode, the microphone is configured to receive the external audio signals. The audio signals received may be further stored in the memory 1304 or sent via the communication component 1316. In some embodiments, the audio component 1310 further includes a speaker configured to output an audio signal.

The I/O interface 1312 provides an interface for the processing component 1302 and a peripheral interface module, and the peripheral interface module may be a keyboard, a click wheel, a button, etc. The buttons may include but not limited to a home button, a volume button, a start button and a lock button.

The sensor component 1314 includes one or more sensors, configured to provide various aspects of status assessment for the device 1300. For example, the sensor component 1314 may detect an on/off state of the device 1300 and a relative positioning of the component. For example, the component is a display and a keypad of the device 1300. The sensor component 1314 may further detect a location change of the device 1300 or one component of the device 1300, a presence or absence of contacts between the user and the device 1300, an orientation or acceleration/deceleration of the device 1300, and a temperature change of the device 1300. The sensor component 1314 may include a proximity sensor, which is configured to detect the existence of the objects nearby without any physical contact. The sensor component 1314 may further include a light sensor such as complementary metal-oxide-semiconductor transistor (CMOS) or charge coupled device (CCD) image sensor, which is configured to use in imaging applications. In some embodiments, the sensor component 1314 may further include an acceleration transducer, a gyroscope sensor, a magnetic sensor, a pressure sensor or a temperature sensor.

The communication component 1316 is configured for the convenience of wire or wireless communication between device 1300 and other devices. The device 1300 may access wireless networks based on a communication standard, such as WiFi, 2G or 3G, 4G NR or their combination. In an embodiment, the communication component 1316 receives broadcast signals or broadcast-related information from an external broadcast management system via a broadcast channel. In an embodiment, the communication component 1316 further includes a near field communication (NFC) module to facilitate short-range communication. For example, an NFC module may be implemented based on a radio frequency identification (RFID) technology, an infrared data association (IRDA) technology, an ultra-wideband (UWB) technology, a Bluetooth (BT) technology and other technologies.

In an embodiment, the device 1300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an embodiment, a non-transitory computer readable storage medium is further provided which includes instructions, such as the memory 1304 including instructions. The instructions may be executed by the processor 1320 of the device 1300 to complete the above methods. For example, the non-transitory computer-readable storage medium may be a ROM, a random access memory (RAM), a CD-ROM, a magnetic tape, a floppy disk, an optical data storage device, etc.

After considering the specification and practicing the disclosure herein, those skilled in the art will easily think of other embodiments of the present application. The present application is intended to cover any variations, usages, or adaptive changes of the present application. These variations, usages, or adaptive changes follow the general principles of the present application and include common knowledge or conventional technical means in the technical field not disclosed in the present application. The description and the embodiments are to be regarded as exemplary only, and the true scope of the present application are referred to the appended claims.

It should be understood that the present disclosure is not limited to the precise structure described above and shown in the drawings, and various modifications and changes may be made without departing from its scope. The scope of the present disclosure is only limited by the appended claims.

It should be noted that the relational terms such as first and second are used herein to distinguish one entity or operation from another entity or operation without necessarily requiring or implying any such actual relationship or order between such entities or operations. The terms "comprise", "comprising" or any other variations, are intended to cover a non-exclusive inclusion, such that a process, a method, an article or a device including a series of elements not only includes those elements but also includes other elements not expressly listed, or may further include elements inherent to such process, method, article, or device. In the absence of more constraints, the elements defined by a sentence "comprising one" do not preclude the presence of additional identical elements in the process, method, article, or device that includes the elements.

The above descriptions of the embodiments of the present disclosure are introduced in detail. Specific examples are applied to elaborate principles and implementations of the present disclosure. The descriptions of the above embodiments are only configured to help understand the method and core concepts of the present disclosure; at the same time, for those skilled in the art, there may be changes in the specific implementation and application scope according to the concepts of the present disclosure. In summary, the contents of the description should not be construed as a limitation of the present disclosure.

What is claimed is:

1. A method for measuring a beam, performed by a terminal, wherein the terminal communicates with a network on a first beam via a first communication channel, and the method comprises:

in response to determining to measure a second beam, measuring the second beam via a second communication channel, wherein a frequency domain resource of the second beam is different from a frequency domain resource of the first beam;

determining to switch the first beam to the second beam based on a measurement result of the second beam; and communicating with the network on the second beam via the first communication channel in response to the first beam being switched to the second beam;

wherein communicating with the network on the second beam via the first communication channel comprises:

determining a second beam direction of the second communication channel in response to measuring the second beam via the second communication channel;

in response to a distance between the second communication channel and the first communication channel being less than a preset distance, configuring a beam direction of the first communication channel as the second beam direction, and communicating with the network on the second beam via the first communication channel; and in response to the distance between the second communication channel and the first communication channel being greater than the preset distance, determining a target beam direction by scanning the beam direction of the first communication channel within a preset angle range of the second beam direction, configuring the beam direction of the first communication channel as the target beam direction, and communicating with the network on the second beam via the first communication channel.

2. The method according to claim 1, wherein the second communication channel is a dedicated communication channel for measuring the second beam.

3. The method according to claim 1, wherein the second communication channel is a communication channel for other communication operations than measuring the second beam, wherein in response to determining to measure the second beam, measuring the second beam via the second communication channel comprises:

in response to determining to measure the second beam, and the second communication channel being in an idle state, measuring the second beam via the second communication channel.

4. The method according to claim 1, wherein the first communication channel comprises at least two subchannels, and the second communication channel is a part of the at least two subchannels.

5. The method according to claim 1, wherein determining to switch the first beam to the second beam based on the measurement result of the second beam comprises:

determining a compensation amount based on a difference between the second communication channel and the first communication channel;

compensating for the measurement result of the second beam based on the compensation amount; and determining to switch the first beam to the second beam based on a compensated measurement result.

6. The method according to claim 5, wherein the difference comprises:

a difference between the first communication channel and the second communication channel in a beam direction, and a difference between the first communication channel and the second communication channel in a radio frequency parameter.

7. The method according to claim 1, wherein communicating with the network on the second beam via the first communication channel comprises one of:

communicating with the network by using a preconfigured resource, on the second beam, via the first communication channel;

or, communicating with the network by using a resource requested from the network before the first beam is switched to the second beam, on the second beam, via the first communication channel.

8. The method according to claim 1, further comprising:

sending capability information to the network, wherein the capability information is configured to indicate, to the network, that the terminal has a capability of measuring the second beam via the second communication channel when communicating with the network on the first beam via the first communication channel.

9. The method according to claim 1, wherein the first beam and the second beam are beams in a non-terrestrial network.

10. A terminal, communicating with a network on a first beam via a first communication channel and comprising:

a processor; and a memory for storing instructions executable by the processor;

wherein, the processor is configured to:

in response to determining to measure a second beam, measure the second beam via a second communication channel, wherein a frequency domain resource of the second beam is different from a frequency domain resource of the first beam;

determine to switch the first beam to the second beam based on a measurement result of the second beam; and wherein the processor is further configured to:

determine a second beam direction of the second communication channel in response to measuring the second beam via the second communication channel;

in response to a distance between the second communication channel and the first communication channel being less than a preset distance, configuring a beam direction of the first communication channel as the second beam direction, and communicating with the network on the second beam via the first communication channel; and in response to the distance between the second communication channel and the first communication channel being greater than the preset distance, determining a target beam direction by scanning the beam direction of the first communication channel within a preset angle range of the second beam direction, configuring the beam direction of the first communication channel as the target beam direction, and communicating with the network on the second beam via the first communication channel.

11. A non-transitory computer-readable storage medium with a computer program stored thereon, wherein when the program is executed by a processor, a method for measuring a beam is implemented, wherein a terminal communicates with a network on a first beam via a first communication channel, and the method comprises:

in response to determining to measure a second beam, measuring the second beam via a second communication channel, wherein a frequency domain resource of the second beam is different from a frequency domain resource of the first beam;

determining to switch the first beam to the second beam based on a measurement result of the second beam; and communicating with the network on the second beam via the first communication channel in response to the first beam being switched to the second beam;

wherein communicating with the network on the second beam via the first communication channel comprises:

determining a second beam direction of the second communication channel in response to measuring the second beam via the second communication channel;

in response to a distance between the second communication channel and the first communication channel being less than a preset distance, configuring a beam direction of the first communication channel as the second beam direction, and communicating with the network on the second beam via the first communication channel; and in response to the distance between the second communication channel and the first communication channel being greater than the preset distance, determining a target beam direction by scanning the beam direction of the first communication channel within a preset angle range of the second beam direction, configuring the beam direction of the first communication channel as the target beam direction, and communicating with the network on the second beam via the first communication channel.

12. The terminal according to claim 10, wherein the second communication channel is a dedicated communication channel for measuring the second beam.

13. The terminal according to claim 10, wherein the second communication channel is a communication channel for other communication operations than measuring the second beam, wherein the processor is further configured to:

in response to determining to measure the second beam, and the second communication channel being in an idle state, measure the second beam via the second communication channel.

14. The terminal according to claim 10, wherein the processor is further configured to:

determine a compensation amount based on a difference between the second communication channel and the first communication channel;

compensate for the measurement result of the second beam based on the compensation amount; and determine to switch the first beam to the second beam based on a compensated measurement result.

15. The terminal according to claim 10, wherein the processor is further configured to:

send capability information to the network, wherein the capability information is configured to indicate, to the network, that the terminal has a capability of measuring the second beam via the second communication channel when communicating with the network on the first beam via the first communication channel.

* * * * *